May 26, 1936.  P. H. CRARY  2,042,390
BRAKE
Filed Sept. 29, 1932  2 Sheets-Sheet 1

Inventor
Palmer H. Crary
By Lloyd W. Patch
Attorney

May 26, 1936.  P. H. CRARY  2,042,390
BRAKE
Filed Sept. 29, 1932  2 Sheets-Sheet 2
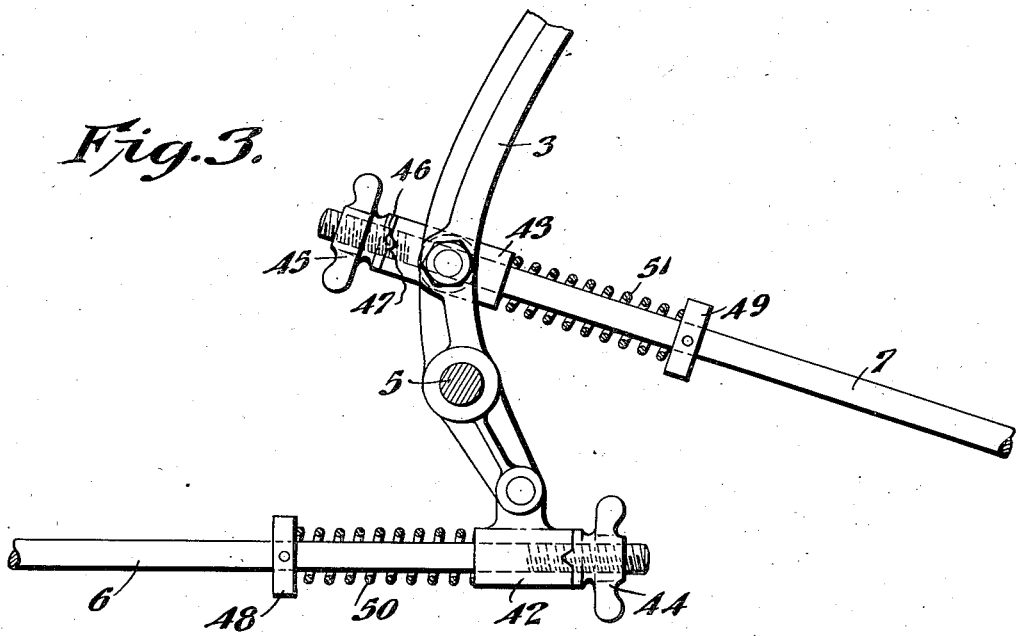
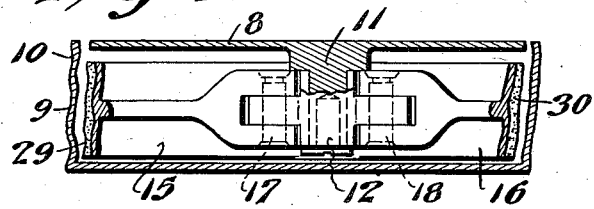
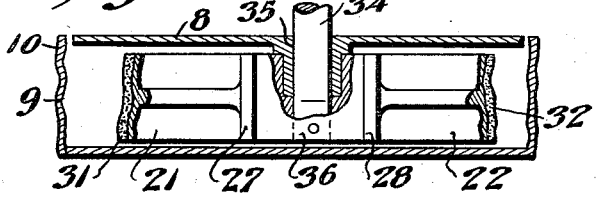
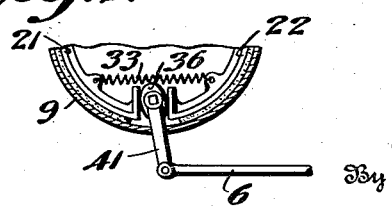
Inventor
Palmer H. Crary
By Lloyd W. Patch
Attorney Patented May 26, 1936

2,042,390

UNITED STATES PATENT OFFICE 2,042,390

BRAKE

Palmer H. Crary, Coconut Grove, Fla., assignor of one-third to Charles A. Fascell, Coconut Grove, Fla.

Application September 29, 1932, Serial No. 635,416

1 Claim. (Cl. 188—78)

My invention relates to brakes, and particularly to an internal expanding brake structure adapted for use on automobiles and other vehicles, upon machinery and instruments, and in fact wherever brakes are applied or used.

An object is to provide a brake structure that is self-adjusting, to thus give substantially even bearing and braking pressure at all points around the brake drum or other member with which the brake is used; but, which will not lock itself accidentally or otherwise to cause accidents, and which becomes effective only when manually actuated or set.

Another object is to provide brake shoe structures in which each portion is made relatively short and self-aligning or self-adjusting, to thus prevent the danger and possibility of warping or other action or shifting of the parts to throw the same out of round.

Yet another object is to so construct and mount the parts that my improved structure can be fitted for use upon various types and makes of automobiles, and the like, without necessitating the installation of special brackets on the chassis, special cross shafts, special couplings, or in fact any other special and unusual parts.

A further object is to provide adjusting means readily accessible to be manipulated by the operator, or by others, without the use of special tools or appliances, and without the specialized knowledge of an expert mechanic or other skilled labor.

A still further object is to provide a brake structure of this character adapted for application to one or several rotating parts, and with which the operation is positive and substantially instantaneous, and with which simultaneous operation or manipulation of several brake units, as for instance a four wheel brake installed upon an automobile, is accomplished, by manipulation of a foot pedal or other actuating portion in usual manner and through a predetermined and uniform path and distance of movement, irrespective of adjustments made to compensate for wear and the like.

Another object is to provide adjusting means of such character that the operation of each of the brake units, of a four wheel brake installation or other multiple installations, can be instantaneously and independently made, and when adjustments are made these will be positively maintained until further manual adjustment or manipulation.

With the above and other objects in view, which will be apparent to those skilled in the art, this invention includes certain novel features of construction and combinations of parts which will be hereinafter set forth in connection with the drawings and then pointed out in the claim.

In the drawings:

Fig. 3 is an enlarged detail view in side elevation of one embodiment of brake operating pedal or lever.

Fig. 4 is a fragmentary detail view, with the parts in section, to better illustrate the brake shoe mounting.

Fig. 5 is a detail sectional view to better show one of the brake shoe connecting bearings.

Fig. 6 is a view in elevation, and partly in section on line 6—6 of Fig. 2, illustrating the brake shoe expanding assembly.

Fig. 7 is a fragmentary detail view showing a modified operating connection.

With internally expanding brake structures as now ordinarily used with automobiles, and in other connections, the brake shoe members, and consequently the brake linings, present curved portions of considerable length intended to fit against and conform to the inner curved wall of a brake drum; however, when the lining becomes worn, and if the brake shoe members become warped or otherwise slightly distorted or misshapen, the outer effective face of the brake lining will not fit properly and conform throughout its length to the corresponding face of the brake drum, and it has been found that ordinarily the brake lining has effective contact with the brake drum only throughout a very short portion of its length at one or two points. Naturally, this relatively short bearing of only a portion of the length of the brake lining does not accomplish proper braking action, and it has been found that where adjustments are made with ordinary brakes, by skilled mechanics and with the most efficient and approved appliances, only a few hours' use may so change the parts that an entirely proper adjustment becomes faulty and has only a very small percentage of possible efficiency.

It is the primary object of my invention to provide a brake structure, of the internal expanding type, that will accomplish and insure maintenance of maximum braking efficiency, by securing contact of the brake lining or other facing with the brake shoe members substantially uniformly throughout their length, with expanding pressure applied substantially uniformly at all points; and, another purpose is to provide actuating mechanism adjustable to compensate for wear to maintain full and efficient operation until the linings or other portions are completely used, the adjusting means being of such character that the operating pedal or other part is maintained and is operable at all times from a uniform position and through a substantially uniform distance of movement.

Figure 1:
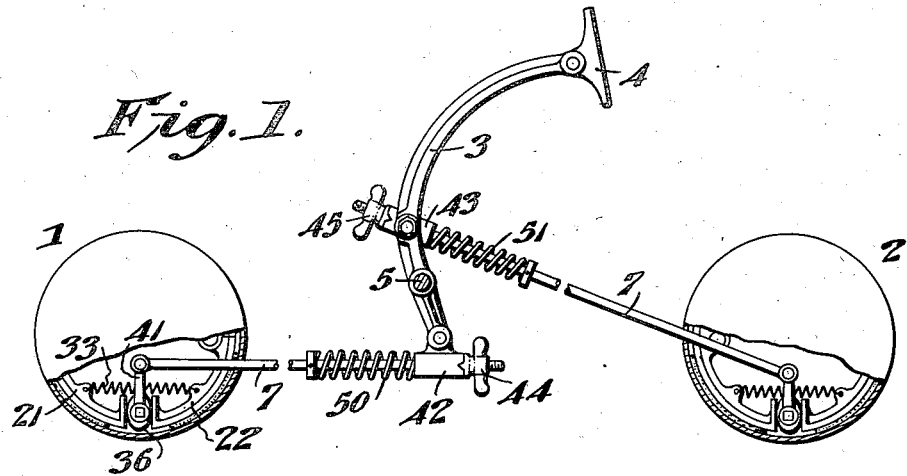
Figure 1 is a view in side elevation illustrating, somewhat diagrammatically, one embodiment of my invention.

As the parts are illustrated in Figure 1, I have shown an adaptation such as might be used upon a four-wheel brake installation of an automobile, and the brake drums 1 and 2 can be taken as illustrative of the brake installations on the forward and rear wheels on each side of the vehicle. The brake operating pedal or lever 3, here shown with a pedal piece 4 for foot manipulation, is given swinging mounting at 5 in the usual manner, and the brakes will be operated through rods 6 and 7 manipulated by actuation of this pedal or lever 3.

Figure 2:
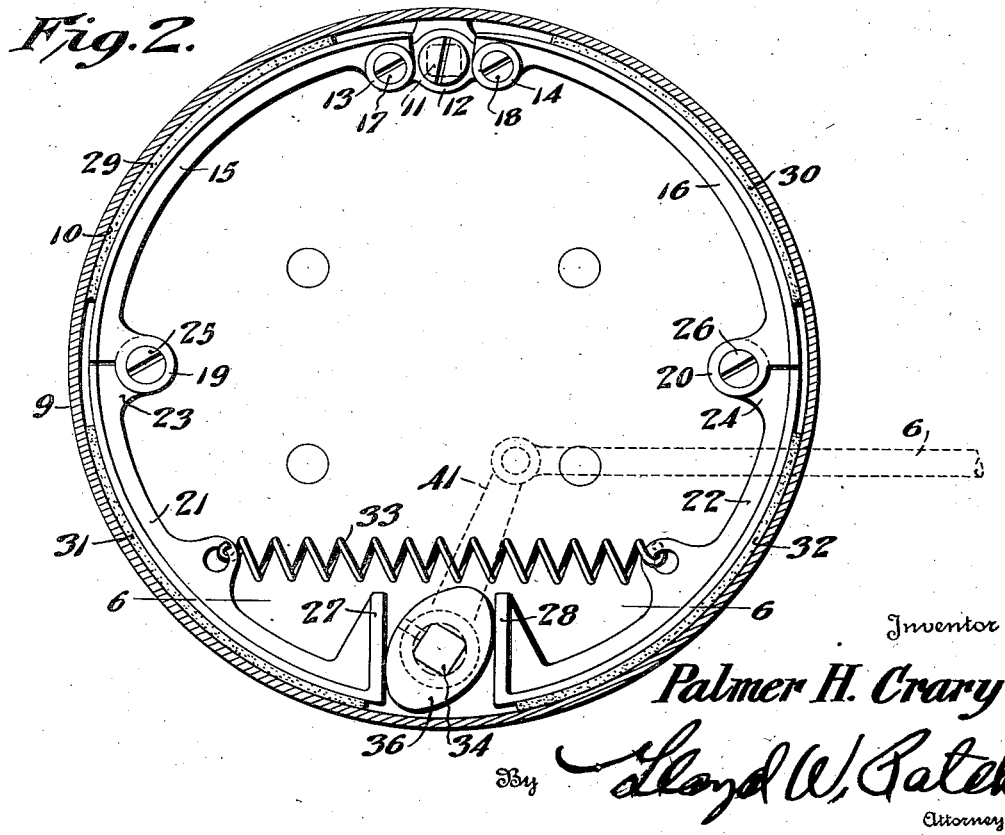
Fig. 2 is an enlarged sectional view showing the internal construction of a brake unit.

As shown in Fig. 2, the supporting plate or structure 8 can be of the usual form, or of any special construction required for the particular installation, and the brake drum 9 can also be of any desired construction and form, the only essential being that the usual circumferential ring or flange 10 be provided thereon with its inner face finished as a brake surface. The brake drum can be attached to the wheel of an automobile, or to any other revolving or rotating part that it is desired to control.

The supporting plate 8 has a mounting pin or stud 11 extending therefrom, preferably adjacent its top, adjacent to but spaced from the path of rotation of the rim 10 of the brake drum. A bearing member 12 mounted on this pin or stud 11 has bearing ears 13 and 14 extending laterally therefrom and provided with bearing openings, the centers of which bearing openings are preferably dropped slightly or spaced inwardly toward the rotational axis of the brake drum. Brake shoe members 15 and 16 hingedly mounted by bearing pins 17 and 18 in pivotal connection with the bearing ears 13 and 14 of bearing member 12 have their free ends terminating preferably at diametrically opposite points substantially ninety degrees on each side from the bearing stud 11.

The brake shoe members 15 and 16 are provided at their ends with hinged bearing portions 19 and 20, and expanded brake shoes 21 and 22 are provided with mating hinged bearing portions 23 and 24 interfitting with the hinged portions 19 and 20. Bearing pins 25 and 26 are provided to connect brake shoes 15 and 21 and brake shoes 16 and 22, respectively, to provide a pair of brake shoes on each side of the suspended mounting on braking stud 11, and the hinge connections by the pins 25 and 26 serve as knuckle joints permitting relative inward swinging movement of the brake shoes 21 and 22 causing locking against outer swinging movement beyond substantially the position illustrated. The free ends of the brake shoe members 21 and 22 are spaced somewhat apart and are provided with reentrant and inwardly extending flanges 27 and 28 disposed in substantially parallel facing relation at a point substantially diametrically opposite to the bearing stud 11.

The several brake shoe members 15, 16, 21, and 22 will all be formed with proper outer flanges and are so constructed and mounted that in position for use they lie within the brake drum with their outer faces spaced from and extending in substantially true concentric arrangement in this spacing from the inner face of the brake drum. Brake lining members 29, 30, 31, and 32 are mounted on these concentric faces of the several brake shoe members, or other suitable lining or treatment is applied to condition the faces of the several brake shoes so that when expanded into contact with the inner face of the rim of the brake drum they will frictionally bear thereagainst to apply braking force. Where block or strip linings or facings are provided for the brake shoes, it is perhaps preferable that these be stopped slightly short of the ends of the shoe members.

A coil spring 33 is connected at its ends to exert resilient pulling force upon brake shoe members 21 and 22, and consequently upon brake shoe members 15 and 16, to contract or draw in the parts to inoperative positions where the brake linings or other faces of the several shoe members will be out of contact with the flange of the brake drum.

An actuating shaft 34 mounted in a suitable bearing 35 for oscillating movement is spaced substantially centrally between the flange portions 27 and 28 of the brake shoe members 21 and 22, and a cam 36, preferably substantially elliptical in form, is fixed on this shaft between the flange portions. This cam member 36 is of such diameter in its shorter dimension that the flange portions 27 and 28 can move inwardly under the resilient pull of spring 33 to dispose the several brake shoes in the contracted or inoperative positions, and the greater axis of the elliptical cam is sufficiently longer that as shaft 34 is oscillated to rock this cam 36 the rounded outer face toward the elongated ends will contact with the inner faces of the flanges 27 and 28, in consequence of which these brake shoes 21 and 22 will be moved and expanded outwardly. The locking hinge connections of the brake shoe members 21 and 22 with the brake shoe members 15 and 16, respectively, will impart this outward expanding movement in equal degree, on radial lines, to each and every one of the brake shoe members, in consequence of which the brake lining portions will be brought to bear entirely and substantially uniformly around and within the flanges of the brake drum. The offset location of the axial centers of pins 17 and 18 mounts the shoe members 15 and 16 in such manner that they rock upwardly and outwardly to expand and contact evenly at all points with the inner face of the flange of the brake drum, and the brake shoe members 21 and 22 are expanded and forced outwardly to contact in like uniform manner.

It is desirable that the various hinge joints be provided with lubrication facilities to thus prevent binding, sticking or freezing of the hinge joints, and to insure easy and substantially equalized movement of the hinge parts in both applying and releasing the brake. With this in mind, each of the hinge pins 17, 18, 25, and 26 can be made substantially as shown in Fig. 5. Each hinge or bearing pin is made up of two parts, the hinge pin portion 37 being adapted to fit within the bearing openings of the two interconnected hinge portions, and the retaining pin or screw 38 being adapted to secure the hinge pin 37 in place. Each of these pins 37 and 38 is provided with a head formed to fit in a correspondingly shaped counter sunk recess in one of the bearing portions, and hinge pin 37 has a central axial bore formed in the end away from the head and internally screw threaded, and the pin 38, externally screw threaded to turn into the bore of the hinge pin 37 has a central bore 39 to receive and hold grease or other lubricant. A lubricating passage 40 is provided laterally through the wall of hinge pin 37 and lubricant is thus conducted to the bearing surfaces of the hinge connection. With this construction and assembly the retaining pin or screw 38 when turned into the through bore of the hinge pin 37 will secure the two pins rigidly in place and the headed portions will bind to lock the parts against accidental or casual loosening and displacement.

A cam operating lever or arm 41 secured on the oscillatable pin 34 can be swung to the position shown in Figure 1 where the cam is rendered inoperative and in consequence the brake is released, and moved to the other position, as indicated in Fig. 2, where the cam bears on its curved sides adjacent the elongated ends to spread the flanged ends 27 and 28 of the expanding shoes 21 and 22, and the pull rods 6 and 7 will be connected with the operating arms 41. These pull rods have their ends extending slidably through openings in operating sleeves 42 and 43 which are swingably connected with the operating treadle or lever 3 at equally spaced points on opposite sides of the swinging mounting, at 5, for this lever. If desired, the sleeves 42 and 43 can be probably located at unequally spaced points on opposite sides of the mounting 5 to thus take care of any greater pull required upon one rod than upon the other to secure equalized operation, or the mounting of the sleeves probably varied to increase the leverage and pull upon either the brake structure at 1, or at 2, as the parts are illustrated in Figure 1.

The end of each of the pull rods 6 and 7, as slidably received through the sleeves 42 and 43, is externally screw threaded and adjusting nuts 44 and 45 are provided to relatively lengthen and shorten the pull rods as adjustment may be required. These adjusting nuts 44 and 45, preferably of the wing nut type in order that they may be more readily and easily manipulated, have substantially V-shaped ridges or ribs 46 on their bearing faces adapted to be received in correspondingly shaped grooves 47 in the adjacent faces of the sleeves 42 and 43. Collars 48 and 49 are fixed on the pull rods 6 and 7, and coil springs 50 and 51 bear between these collars and the sleeves 42 and 43 to thus hold the rods against rolling and to retain the adjusting nuts in contact with the corresponding ends of the sleeves 42 and 43, where the ribs of the adjusting nuts will be retained in the grooves of the sleeves. When it is desired to make adjustments, it is only necessary to exert twisting or turning force upon the winged adjusting nuts 44 and 45, and these adjusting nuts will be rotated so that the ribs 46 will ride out of the retaining grooves 47 and the adjusting nuts can be turned to give any desired adjusting. When the adjustment has been made the adjusting nut is turned slightly to insure that the ribs 46 thereof will set within the recess or groove 47, and the adjusting nut is positively locked and retained against casual or accidental turning.

Due to the fact that the cams 36 are made substantially elliptical in form, these cams will prove effective to expand the brake shoes up to any point or degree necessary through the wearing of the brake bands or other causes, until the actual total length of the greatest dimension of the elliptical form has been reached, and in each instance the cam is adjusted by manipulation of the adjusting nut 44 or 45, and the position of the lever or treadle 3 is not changed, nor is the degree or extent of movement for manipulation of the brake changed in any of the settings or adjustments.

As shown in the dotted lines of Fig. 2, the mounting pin or stud 11 is made square in cross section or the bearing member 12 is keyed or otherwise secured in rigid mounting to be positively held against rocking movement. This is necessary to prevent the brake shoes shifting or cramping in their mounting and assembly which might cause self-locking of the brake and consequent accidents. With my brake structure there is no possibility of accidental locking, and the brake will be applied only when the operating mechanism is manipulated.

While I have herein shown and described only certain embodiments of my invention and have set forth only certain possible modifications, it will be appreciated that many changes and variations can be made in the form, construction, arrangement, assembly, mounting, and use of the parts, without departing from the spirit and scope of my invention.

I claim:

An expanding brake comprising, with a rotatably mounted drum having an internally faced brake rim, a stationary supporting plate, a polygonal mounting stud stationarily carried by the supporting plate adjacent to and spaced from the brake face, an operating shaft rockably mounted through the plate substantially diametrically opposite said stationary stud, a bearing member stationarily held on said polygonal stud and provided with bearing ears extending laterally on opposite sides of said stud, a pair of curved swinging brake shoe members provided with bifurcated bearing ears receiving and rockably pivoted on the laterally extending bearing ears of the bearing member, each of said swinging brake shoe members being provided at its free end with a bearing ear, curved expanding brake shoe members provided with bifurcated bearing portions receiving and rockably pivoted on the bearing ears of the swinging brake shoes, said expanding brake shoe members terminating at their free ends on opposite sides of the operating shaft and being provided with facing contact flanges spaced therefrom, a spring connected between the expanding brake shoes to normally draw the expanding and the swinging brake shoes inwardly to contracted relation out of contact with the brake drum, and a double cam on said operating shaft engaged with said contact flanges by rocking movement of the shaft to move the expanding and the swinging brake members outwardly into braking contact with the brake rim.

PALMER H. CRARY.